US012145430B2

(12) United States Patent
Welter

(10) Patent No.: US 12,145,430 B2
(45) Date of Patent: Nov. 19, 2024

(54) VEHICLE SUN VISOR ASSEMBLY

(71) Applicant: Daimay France SAS, Creutzwald (FR)

(72) Inventor: Patrick Welter, Lachambre (FR)

(73) Assignee: Daimay France SAS, Creutzwald (FR)

( * ) Notice: Subject to any disclaimer, the term of this patent is extended or adjusted under 35 U.S.C. 154(b) by 412 days.

(21) Appl. No.: 17/507,226

(22) Filed: Oct. 21, 2021

(65) Prior Publication Data

US 2022/0041039 A1 Feb. 10, 2022

Related U.S. Application Data

(60) Continuation of application No. 16/600,676, filed on Oct. 14, 2019, now Pat. No. 11,155,145, which is a division of application No. 15/381,612, filed on Dec. 16, 2016, now Pat. No. 10,442,277.

(60) Provisional application No. 62/268,335, filed on Dec. 16, 2015.

(51) Int. Cl.
*B60J 3/02* (2006.01)
(52) U.S. Cl.
CPC .......... *B60J 3/0239* (2013.01); *B60J 3/0204* (2013.01); *B60J 3/0234* (2013.01); *B60J 3/0265* (2013.01)
(58) Field of Classification Search
CPC ...... B60J 3/0204; B60J 3/0234; B60J 3/0265; B60J 3/0239
See application file for complete search history.

(56) References Cited

U.S. PATENT DOCUMENTS

| 3,463,435 | A | | 8/1969 | McGrew, Jr. | |
|---|---|---|---|---|---|
| 4,617,699 | A | * | 10/1986 | Nakamura | B60J 3/0252 16/342 |
| 5,580,118 | A | | 12/1996 | Crotty, III | |
| 6,010,175 | A | * | 1/2000 | Bodar | B60J 3/0265 296/97.11 |

(Continued)

FOREIGN PATENT DOCUMENTS

| DE | 4104032 | 4/1992 |
|---|---|---|
| DE | 102006043206 | 2/2008 |

(Continued)

OTHER PUBLICATIONS

EP 16204854.0 Extended Search Report dated Aug. 21, 2017, 11 pages.

(Continued)

*Primary Examiner* — Daniel J Wiley
(74) *Attorney, Agent, or Firm* — Fletcher Yoder, P.C.

(57) ABSTRACT

A slide-on-rod assembly includes a tube and a carriage configured to move within the tube. The carriage has a first contact surface, the carriage includes a wing rotatably coupled to a body of the carriage, the wing has a second contact surface, the first contact surface of the carriage is configured to contact a corresponding first contact surface of the tube, and the second contact surface of the wing is configured to contact a corresponding second contact surface of the tube. The slide-on-rod assembly also includes a biasing member coupled to the at least one wing and to the body of the carriage. The biasing member is configured to drive the first contact surface of the carriage into contact with the corresponding first contact surface of the tube and the second contact surface of the wing into contact with the corresponding second contact surface of the tube.

16 Claims, 8 Drawing Sheets

(56) References Cited

U.S. PATENT DOCUMENTS

| | | | |
|---|---|---|---|
| 6,131,985 A | 10/2000 | Twietmeyer et al. | |
| 6,139,083 A * | 10/2000 | Fischer | B60J 3/0252 362/144 |
| 6,830,280 B2 * | 12/2004 | Sturt | B60J 3/0265 403/329 |
| 7,032,949 B1 * | 4/2006 | Wang | B60J 3/0239 296/97.5 |
| 7,784,847 B2 * | 8/2010 | Asai | B60J 3/0252 296/97.1 |
| 7,866,724 B2 | 1/2011 | Olep et al. | |
| 7,963,582 B2 | 6/2011 | Wieczorek et al. | |
| 8,434,811 B2 | 5/2013 | Rockafellow et al. | |
| 8,905,457 B2 * | 12/2014 | Mertz | B60J 3/0265 296/97.11 |
| 9,033,392 B2 * | 5/2015 | Asai | B60J 3/0252 296/97.9 |
| 9,834,068 B2 * | 12/2017 | Cha | B60J 3/0265 |
| 10,442,277 B2 * | 10/2019 | Welter | B60J 3/0234 |
| 2004/0145209 A1 * | 7/2004 | Peterson | B60J 3/0208 296/97.11 |
| 2009/0134657 A1 | 5/2009 | Asai | |
| 2009/0200828 A1 * | 8/2009 | Welter | B60J 3/0265 296/97.12 |
| 2010/0019527 A1 | 1/2010 | Asai | |
| 2011/0260492 A1 * | 10/2011 | Ogawa | B60J 3/0265 296/97.11 |
| 2013/0069388 A1 | 3/2013 | Huff et al. | |
| 2013/0320698 A1 * | 12/2013 | Asai | B60J 3/0239 296/97.1 |
| 2014/0049066 A1 | 2/2014 | Mertz | |
| 2015/0165877 A1 | 6/2015 | Cha et al. | |
| 2016/0114657 A1 * | 4/2016 | Moelker | B60J 3/0265 296/97.9 |
| 2016/0288626 A1 | 10/2016 | Aoki et al. | |
| 2017/0313164 A1 | 11/2017 | Lehman et al. | |
| 2018/0304816 A1 | 10/2018 | Welter et al. | |
| 2020/0276887 A1 | 9/2020 | Huff | |

FOREIGN PATENT DOCUMENTS

| | | |
|---|---|---|
| EP | 0231440 | 8/1987 |
| FR | 2697781 | 5/1994 |
| JP | 2010173385 | 8/2010 |

OTHER PUBLICATIONS

Extended European Search Report for EP Application No. 19188843.7 mailed Nov. 12, 2019, 7 pgs.

* cited by examiner

VEHICLE SUN VISOR ASSEMBLY

CROSS REFERENCE TO RELATED APPLICATIONS

This application is a continuation of U.S. patent application Ser. No. 16/600,676, entitled "VEHICLE SUN VISOR ASSEMBLY", filed Oct. 14, 2019, which is a divisional of U.S. patent application Ser. No. 15/381,612, entitled "SLIDE-ON-ROD ASSEMBLY FOR A VEHICLE SUN VISOR", filed Dec. 16, 2016, now U.S. Pat. No. 10,442,277, which claims priority from and the benefit of U.S. Provisional Application Ser. No. 62/268,335, entitled "SLIDE-ON-ROD ASSEMBLY FOR A VEHICLE SUN VISOR", filed Dec. 16, 2015. Each of the foregoing applications is hereby incorporated by reference in its entirety.

BACKGROUND

The disclosure relates generally to a slide-on-rod assembly for a vehicle sun visor.

Many vehicles employ sun visors to shield occupants from sunlight, thereby enabling the occupants to focus on the surrounding environment. For example, certain vehicles include sun visors positioned adjacent to a top portion of the windshield to facilitate access by a driver and/or front passenger. Under certain lighting conditions, a driver may deploy the sun visor to reduce light transmission into the vehicle interior, thereby enabling the driver to focus on vehicle operations. Certain sun visors include a positioning assembly configured to enable the sun visor to rotate between a stowage position and a deployed position, and to enable the sun visor to slide from a retracted position to an extended position. Unfortunately, the positioning assembly may increase a thickness of the sun visor, thereby reducing occupant headroom and/or increasing a height of the vehicle roofline.

BRIEF DESCRIPTION

The present disclosure relates to a slide-on-rod assembly for a vehicle sun visor including a tube and a carriage configured to move within the tube. The carriage has at least one first contact surface, the carriage includes at least one wing rotatably coupled to a body of the carriage, the at least one wing has at least one second contact surface, the at least one first contact surface of the carriage is configured to contact at least one corresponding first contact surface of the tube, and the at least one second contact surface of the at least one wing is configured to contact at least one corresponding second contact surface of the tube. The slide-on-rod assembly also includes a biasing member coupled to the at least one wing and to the body of the carriage. The biasing member is configured to drive the at least one first contact surface of the carriage into contact with the at least one corresponding first contact surface of the tube and the at least one second contact surface of the at least one wing into contact with the at least one corresponding second contact surface of the tube.

The present disclosure also relates to a slide-on-rod assembly for a vehicle sun visor including a carriage having a first angled contact surface, a second angled contact surface, a third angled contact surface, and a fourth angled contact surface. The first angled contact surface of the carriage is positioned on an opposite lateral side of the carriage from the second angled contact surface of the carriage, the third angled contact surface of the carriage is positioned on the opposite lateral side of the carriage from the fourth angled contact surface of the carriage, and the first and second angled contact surfaces of the carriage are positioned on an opposite vertical side of the carriage from the third and fourth angled contact surfaces of the carriage. The slide-on-rod assembly also includes a tube having a first angled contact surface, a second angled contact surface, a third angled contact surface, and a fourth angled contact surface. The first angled contact surface of the tube is positioned on an opposite lateral side of the tube from the second angled contact surface of the tube, the third angled contact surface of the tube is positioned on the opposite lateral side of the tube from the fourth angled contact surface of the tube, and the first and second angled contact surfaces of the tube are positioned on an opposite vertical side of the tube from the third and fourth angled contact surfaces of the tube. In addition, the first angled contact surface of the carriage is configured to contact the first angled contact surface of the tube, the second angled contact surface of the carriage is configured to contact the second angled contact surface of the tube, the third angled contact surface of the carriage is configured to contact the third angled contact surface of the tube, and the fourth angled contact surface of the carriage is configured to contact the fourth angled contact surface of the tube.

The present disclosure further relates to a slide-on-rod assembly for a vehicle sun visor including a rod and a carriage having a first contact surface. The slide-on-rod assembly also includes a spring cage disposed about at least a portion of the carriage and having a second contact surface, in which the first and second contact surfaces are configured to face the rod. In addition the slide-on-rod assembly includes at least one biasing member disposed between respective support surfaces of the carriage and the spring cage. And, the at least one biasing member is configured to urge the first and second contact surfaces toward one another such that the first and second contact surfaces compress the rod.

DRAWINGS

DETAILED DESCRIPTION

Figure 1:
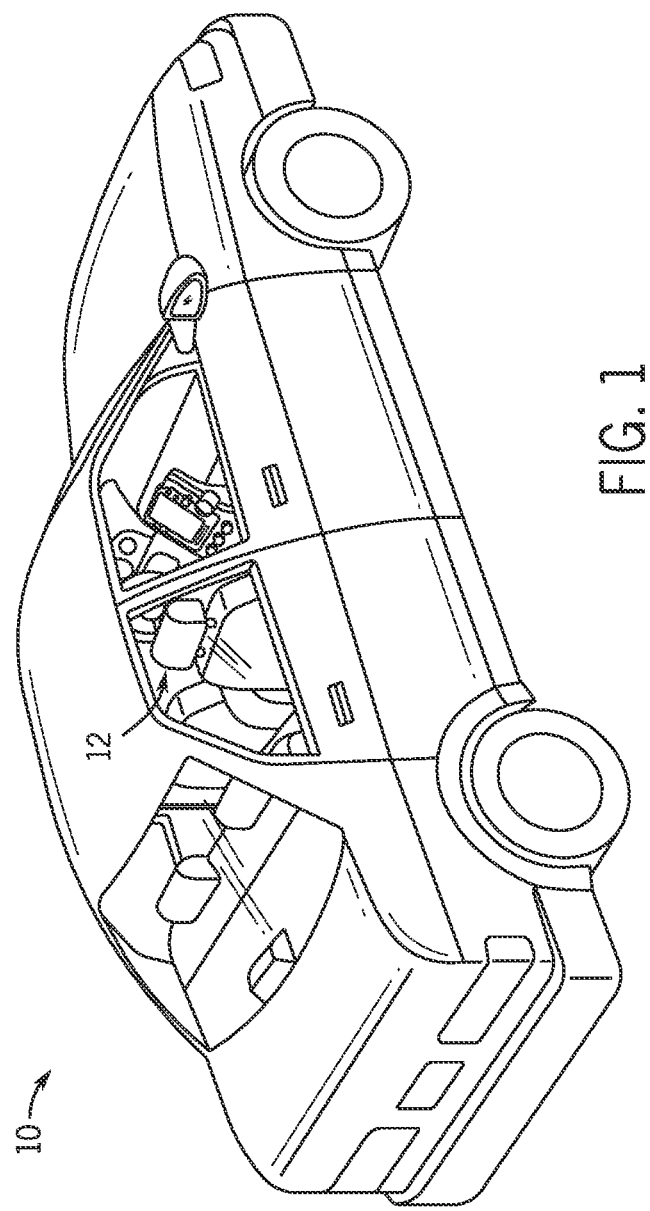
FIG. 1 is a perspective view of an embodiment of a vehicle that may include at least one sun visor having a slide-on-rod assembly.

FIG. 1 is a perspective view of an embodiment of a vehicle 10. In certain embodiments, the vehicle 10 may include at least one sun visor within an interior 12 of the vehicle 10. In such embodiments, the sun visor is configured to shield a vehicle occupant from sunlight. The sun visor may include a slide-on-rod assembly configured to enable the sun visor to rotate between a stowage position and a deployed position, and to enable the sun visor to slide from a retracted position to an extended position.

Figure 2:
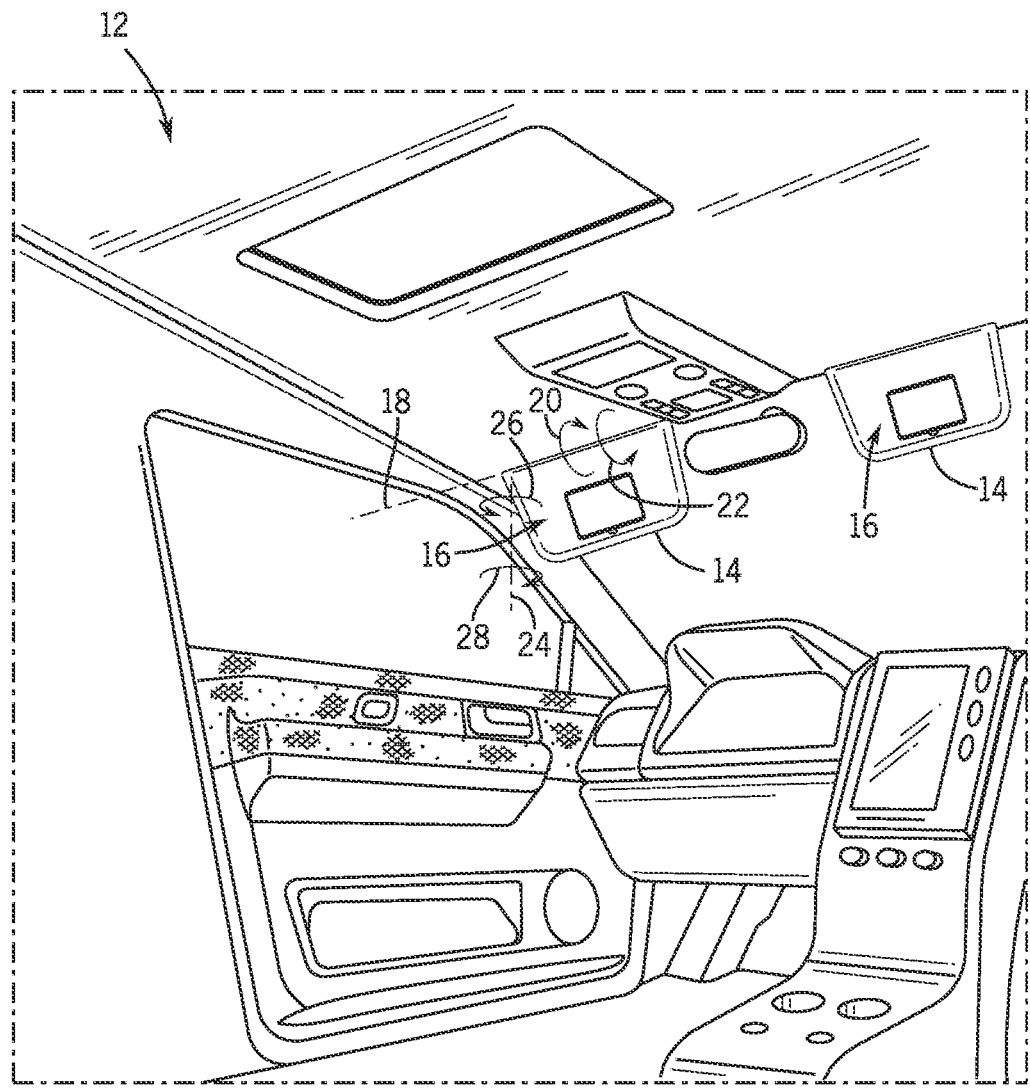
FIG. 2 is a perspective view of a part of the interior of the vehicle of FIG. 1, in which a sun visor is in a deployed position, in accordance with an embodiment of the present disclosure.

FIG. 2 is a perspective view of a part of the interior of the vehicle of FIG. 1, in accordance with an embodiment of the present disclosure. As illustrated, the vehicle interior 12 includes a sun visor 14 having a vanity mirror assembly 16. However, in certain embodiments, the vanity mirror assembly may be omitted. In the illustrated embodiment, the sun visor 14 is configured to rotate about a rotational axis 18 between a stowage position (e.g., parallel to a headliner of the vehicle interior and/or in contact with the headliner) and the illustrated usage position (e.g., deployed to reduce light transmission into the vehicle interior). For example, to transition the sun visor 14 from the illustrated usage position to the stowage position, a vehicle occupant may rotate the sun visor 14 in a first rotational direction 20 about the rotational axis 18. Conversely, to transition the sun visor 14 from the stowage position to the illustrated usage position, the vehicle occupant may rotate the sun visor 14 in a second rotational direction 22 about the rotational axis 18.

In the illustrated embodiment, the sun visor 14 is also configured to rotate about a second rotational axis 24 between the illustrated usage position and a second usage position (e.g., proximate to a window of the vehicle to reduce light transmission through the window). For example, to transition the sun visor 14 from the illustrated usage position to the second usage position, a vehicle occupant may rotate the sun visor 14 in a third rotational direction 26 about the second rotational axis 24. Conversely, to transition the sun visor 14 from the second usage position to the illustrated usage position, the vehicle occupant may rotate the sun visor in a fourth rotational direction 28 about the second rotational axis 24. As discussed in detail below, the sun visor 14 may move between a retracted position and an extended position while in the second usage position.

Figure 3:
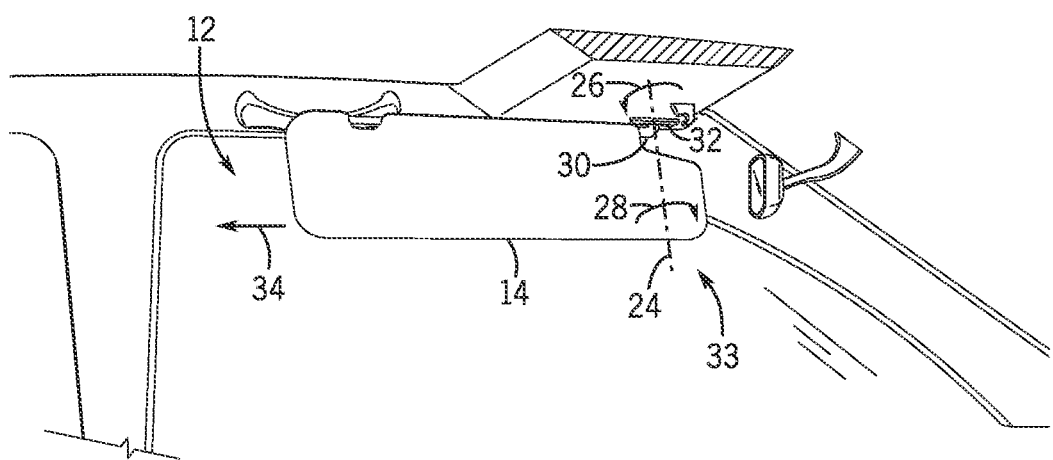
FIG. 3 is a perspective view of a part of the interior of the vehicle of FIG. 1, in which the sun visor is in a retracted position, in accordance with an embodiment of the present disclosure.

FIG. 3 is a perspective view of a part of the interior 12 of the vehicle of FIG. 1, in which the sun visor 14 is in a retracted position, in accordance with an embodiment of the present disclosure. As illustrated, the sun visor 14 is in the second usage position proximate to the window of the vehicle door. With the sun visor 14 in the second usage position, the sun visor 14 may reduce light transmission through the window, thereby shielding the vehicle occupant from sunlight. In the illustrated embodiment, the sun visor 14 is supported by a rod 30 rotatably coupled to a mounting assembly 32. The mounting assembly 32, in turn, is coupled to a structure of the vehicle (e.g., roof panel, interior panel, etc.). The coupling between the rod 30 and the mounting assembly 32 enables the sun visor 14 to rotate about the second rotational axis 24 in the third and fourth rotational directions 26 and 28 between the usage positions (e.g., the illustrated second usage position and the usage position shown in FIG. 2). The sun visor 14 and the rod 30 form a vehicle sun visor assembly 33.

In the illustrated embodiment, the sun visor 14 is configured to move in a first translational direction 34 from the illustrated retracted position to an extended position. For example, as discussed in detail below, the sun visor may include a slide-on-rod assembly configured to enable the sun visor to slide relative to the rod 30. Accordingly, the sun visor may be moved between the illustrated retracted position and the extended position to enable an occupant to place the sun visor in a location that shields the occupant from sunlight.

Figure 4:
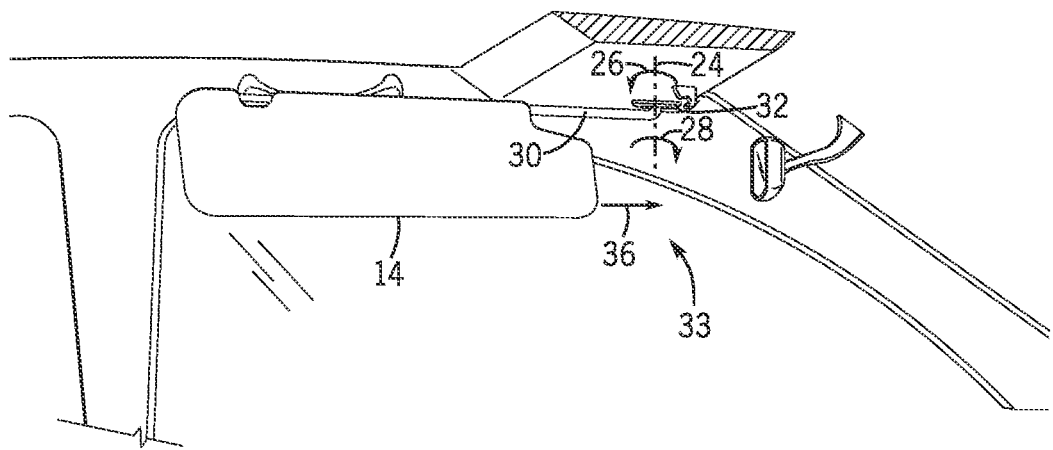
FIG. 4 is a perspective view of a part of the interior of the vehicle of FIG. 1, in which the sun visor is in an extended position, in accordance with an embodiment of the present disclosure.

FIG. 4 is a perspective view of a part of the interior of the vehicle of FIG. 1, in which the sun visor is in an extended position, in accordance with an embodiment of the present disclosure. As illustrated, with the sun visor 14 in the extended position, the sun visor 14 may block sunlight passing through a rear portion of the window of the vehicle door. To transition the sun visor 14 from the illustrated extended position to the retracted position, the occupant may move the sun visor 14 in a second translational direction 36. Once in the retracted position, the occupant may rotate the sun visor in the third rotational direction 28 about the second rotational axis 24 to the usage position shown in FIG. 2. As discussed in detail below, the sun visor may rotate about the rod 30 between the usage position shown in FIG. 2 and the stowage position (e.g., about the rotational axis 18 in the first rotational direction 20).

Figure 5:
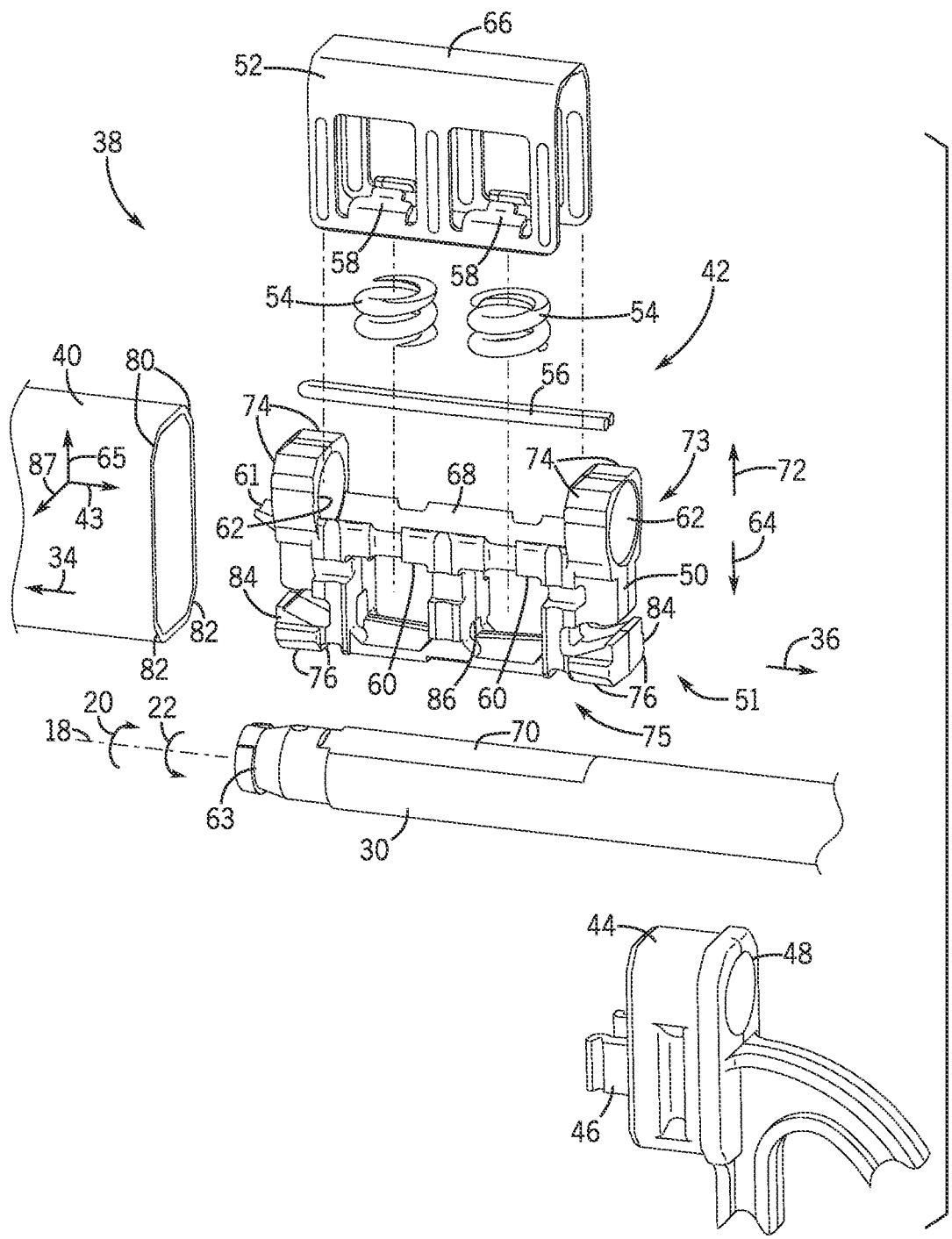
FIG. 5 is an exploded view of an embodiment of a slide-on-rod assembly that may be employed within the sun visor of FIGS. 2-4.

FIG. 5 is an exploded view of an embodiment of a slide-on-rod assembly 38 that may be employed within the sun visor of FIGS. 2-4. In the illustrated embodiment, the slide-on-rod assembly 38 includes a tube 40 (e.g., formed from steel via bending and welding processes, from aluminum via an extrusion process, from plastic via an injection molding process, etc.) and a carriage assembly 42 configured to be disposed within the tube 40. The tube 40 is configured to be secured to the sun visor, and the carriage assembly 42 is configured to be secured to the rod 30. The sun visor may move between the retracted and extended positions via translation of the tube 40 relative to the carriage assembly 42 along a longitudinal axis 43. In the illustrated embodiment, the tube 40 is secured to the sun visor by an end cap 44. The end cap 44 is coupled to the sun visor and includes clips 46 configured to secure the end cap 44 to the tube 40. The end cap 44 also includes an opening 48 configured to facilitate passage of the rod 30 into the tube 40. The end cap 44 is configured to block removal of the carriage assembly 42 from the tube 40, thereby limiting movement of the sun visor past the extended position in the first translational direction 34.

In the illustrated embodiment, the carriage assembly 42 includes a carriage 50 (e.g., support element 51), a spring cage 52, coil springs 54 (e.g., rod biasing members), and a wire spring 56. The spring cage 52 is configured to be disposed about a portion of the carriage 50, and each coil spring 54 is configured to be disposed between a respective spring support 58 of the spring cage 52 (e.g., having a support surface) and a respective support surface 60 of the carriage 50. In addition, the rod 30 is configured to be disposed within two openings 62 within the carriage 50, and the rod 30 is configured to be secured to the carriage via engagement of a protrusion 61 of the carriage 50 with a recess 63 of the rod 30. The coil springs 54 are configured to urge the spring cage 52 in a downward direction 64 along a vertical axis 65, thereby driving a contact surface 66 (e.g., second rod contact surface) of the spring cage 52 against the rod 30. As a result, the rod 30 is driven against a contact surface 68 (e.g., first rod contact surface) of the carriage 50, thereby compressing the rod 30 between the contact surfaces 66 and 68. Friction between the rod 30 and the contact surfaces 66 and 68 establishes resistance to rotation of the sun visor about the rod 30 (e.g., in the first and second rotational directions 20 and 22 about the rotational axis 18).

In the illustrated embodiment, the contact surface 66 of the spring cage 52 is substantially flat and configured to interact with a substantially flat surface 70 of the rod 30. While the sun visor is in the stowage position, the substantially flat surfaces 66 and 70 are in contact with one another. As a result, the sun visor is biased into the stowage position. To transition the sun visor to the usage position, a force is applied to the sun visor sufficient to cause the rod 30 to drive the spring cage 52 in an upward direction 72 along the vertical axis 65 against the force of the coil springs 54, thereby facilitating rotation of the sun visor about the rod 30. Because the spring cage 52 includes the contact surface 66, a separate contact plate, which may be positioned vertically below the rod in certain carriage assemblies, may be obviated. As a result, the cost and/or complexity of the carriage assembly may be reduced.

While the illustrated embodiment includes two coil springs 54, it should be appreciated that in alternative embodiments, the carriage assembly may include more or fewer coil springs. For example, in certain embodiments, the carriage assembly may include 1, 2, 3, 4, 5, 6, or more coil springs. In addition, while the diameter of each coil spring in the illustrated embodiment is about 10 mm, it should be appreciated that alternative embodiments may include larger diameter coil springs or smaller diameter coil springs. Furthermore, while the illustrated embodiment includes coil springs, it should be appreciated that in certain embodiments, the carriage assembly may include other types of biasing member(s) (e.g., leaf springs, etc.).

In the illustrated embodiment, the carriage 50 includes four first contact surfaces 74 on a vertically upper portion 73 of the carriage 50 and four second contact surfaces 76 on a vertically lower portion 75 of the carriage 50. The first contact surfaces 74 are configured to engage corresponding first contact surfaces 80 of the tube 40, and the second contact surfaces 76 are configured to engage corresponding second contact surfaces 82 of the tube 40. Contact between the contact surfaces establishes resistance to movement of the tube 40 along the longitudinal axis 43 relative to the carriage assembly 42, thereby establishing resistance to movement of the sun visor between the retracted position and the extended position. In the illustrated embodiment, the second contact surfaces 76 are formed on wings 84 of the carriage 50. As illustrated, the wings 84 extend from opposite longitudinal sides of a body of the carriage. The wings 84 are configured to flex/rotate relative to the body of the carriage, and the wire spring 56 is configured to bias the wings 84 in the downward direction 64 via contact with the wings 84 and a support surface 86 of the carriage 50. Accordingly, the wire spring 56 is configured to drive each of the contact surfaces 74 and 76 of the carriage 50 into contact with the corresponding contact surfaces 80 and 82 of the tube 40. As a result, the possibility of movement of the tube 40 relative to the carriage 50 along the vertical axis 65 and/or along a lateral axis 87 is substantially reduced or eliminated, thereby substantially reducing or eliminating the possibility of rattling and the associated actuation noise. In addition, the resistance to movement of the sun visor between the retracted position and the extended position may be controlled based on the stiffness of the wire spring 56. For example, a stiffer wire spring may increase the contact force between the contact surfaces of the carriage and the corresponding contact surfaces of the tube, thereby increasing resistance to movement of the sun visor. In addition, a softer wire spring may reduce the contact force between the contact surfaces of the carriage and the corresponding contact surfaces of the tube, thereby reducing the resistance to movement of the sun visor.

While the illustrated embodiment includes a wire spring 56, it should be appreciated that in alternative embodiments, the carriage assembly may include a leaf spring or any other suitable type of biasing member. Furthermore, while the illustrated embodiment includes a single wire spring 56, it should be appreciated that in alternative embodiments, the carriage assembly may include additional wire springs or other biasing members. While the wings 84 are integrally formed with the body of the carriage 50 in the illustrated embodiment, it should be appreciated that in alternative embodiments, the wings may be separately formed and coupled (e.g., rotatably coupled) to the carriage body. In addition, while the illustrated embodiment includes two wings 84, it should be appreciated that in alternative embodiments, the carriage may include more or fewer wings (e.g., 1, 2, 3, 4, or more). While the tube 40 has an octagonal cross-section and the carriage 50 includes eight contact surfaces 74 and 76, it should be appreciated that the number of sides of the tube and the number of contact surfaces of the carriage may be different in alternative embodiments. For example, in certain embodiments, the tube may include 12 sides and the carriage may include 16 contact surfaces. However, it should be appreciated that the tube may include any suitable number of surfaces and the carriage may include any suitable number of contact surfaces. Furthermore, while the tube is closed (e.g., the cross-section does not include a gap) in the illustrated embodiment, it should be appreciated that in alternative embodiments, the tube may be open (e.g., the cross-section may include a gap). In embodiments including an open tube, the slide-on-rod assembly may include a retaining feature (e.g., strap, etc.) configured to block expansion of the gap.

Figure 6:
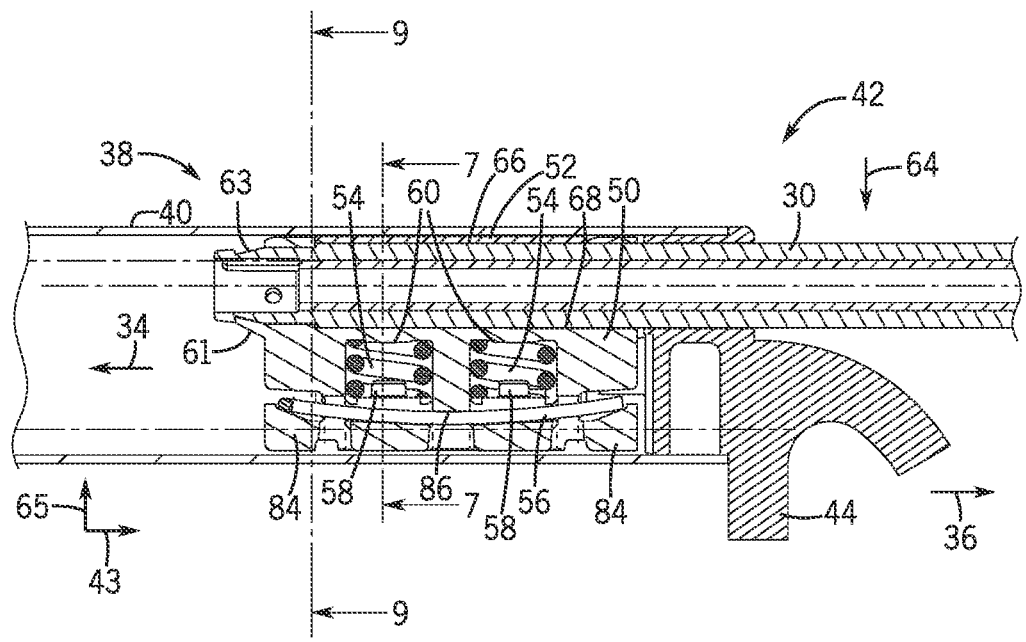
FIG. 6 is a cross-sectional view of the slide-on-rod assembly of FIG. 5.

FIG. 6 is a cross-sectional view of the slide-on-rod assembly 38 of FIG. 5. As illustrated, the carriage assembly 42 is disposed within the tube 40. As previously discussed, the sun visor may move between the retracted position and the extended position via translation of the tube 40 relative to the carriage assembly 42 along the longitudinal axis 43. For example, movement of the sun visor toward the extended position in the translational direction 34 moves the tube 40 in the direction 34 relative to the carriage assembly 42. Conversely, movement of the sun visor toward the retracted position in the translational direction 36 moves the tube 40 in the direction 36 relative to the carriage assembly 42. As illustrated, the end cap 44 is secured to the tube 40 to block removal of the carriage assembly 42 from the tube 40.

As illustrated, each coil spring 54 is disposed between a respective spring support 58 of the spring cage 52 and a respective support surface 60 of the carriage 50. In addition, the rod 30 extends through the carriage 50, and the rod 30 is secured to the carriage via engagement of the protrusion 61 of the carriage 50 with the recess 63 of the rod 30. The coil springs 54 urge the spring cage 52 in the downward direction 64 along the vertical axis 65, thereby driving the contact surface 66 of the spring cage 52 against the rod 30. As a result, the rod 30 is driven against the contact surface 68 of the carriage 50, thereby compressing the rod 30 between the contact surfaces 66 and 68. As previously discussed, friction between the rod 30 and the contact surfaces 66 and 68 establishes resistance to rotation of the sun visor about the rod 30.

As previously discussed, the wings 84 of the carriage 50 are configured to flex/rotate relative to the body of the carriage, and the wire spring 56 biases the wings 84 in the downward direction 64 via contact with the wings 84 and the support surface 86 of the carriage 50. Accordingly, the wire spring 56 drives the contact surfaces of the carriage 50 into contact with the corresponding contact surfaces of the tube 40. As a result, the possibility of movement of the tube 40 relative to the carriage 50 along the vertical axis 65 or along the lateral axis is substantially reduced or eliminated, thereby substantially reducing or eliminating the possibility of rattling and the associated actuation noise.

Figure 7:
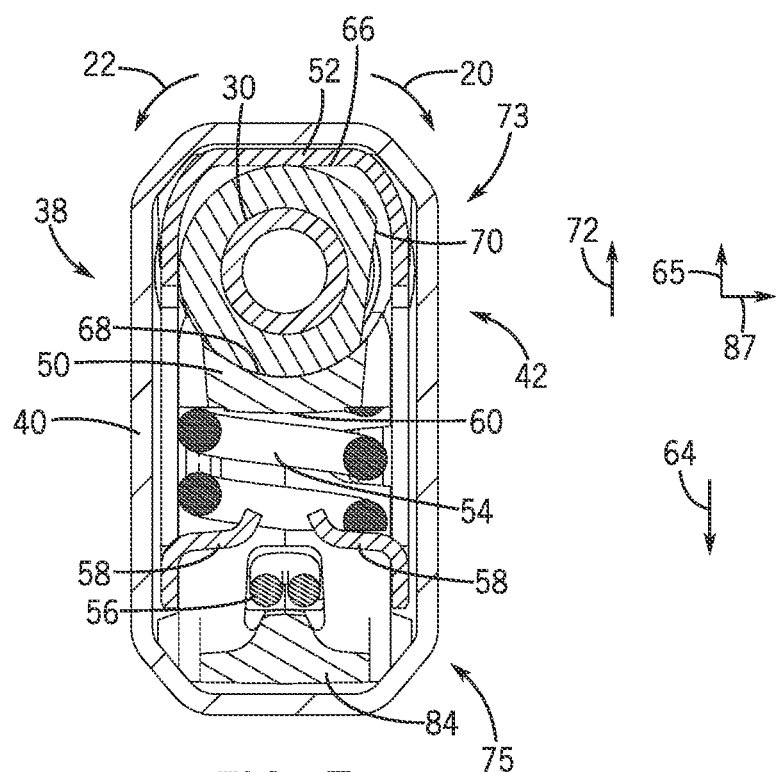
FIG. 7 is a cross-sectional view of the slide-on-rod assembly of FIG. 5, taken along line 7-7, in which the sun visor is in a deployed position.

FIG. 7 is a cross-sectional view of the slide-on-rod assembly 38 of FIG. 5, taken along line 7-7, in which the sun visor is in a deployed position. As illustrated, each coil spring 54 is disposed between a respective spring support 58 of the spring cage 52 and a respective support surface 60 of the carriage 50. In addition, the rod 30 extends through the carriage 50. The coil springs 54 urge the spring cage 52 in the downward direction 64 along the vertical axis 65 relative to the carriage 50, thereby driving the contact surface 66 of the spring cage 52 against the rod 30. As a result, the rod 30 is driven against the contact surface 68 of the carriage 50, thereby compressing the rod 30 between the contact surfaces 66 and 68. As previously discussed, friction between the rod 30 and the contact surfaces 66 and 68 establishes resistance to rotation of the sun visor about the rod 30 in the first and second rotational direction 20 and 22. In the illustrated embodiment, the spring cage 52 does not extend beyond the carriage 50 in the lateral direction 87. Accordingly, the thickness of the carriage assembly 42 may be reduced, as compared to carriage assemblies that include a spring cage disposed about laterally outward surfaces of the carriage and extending beyond the carriage in the lateral direction.

Figure 8:
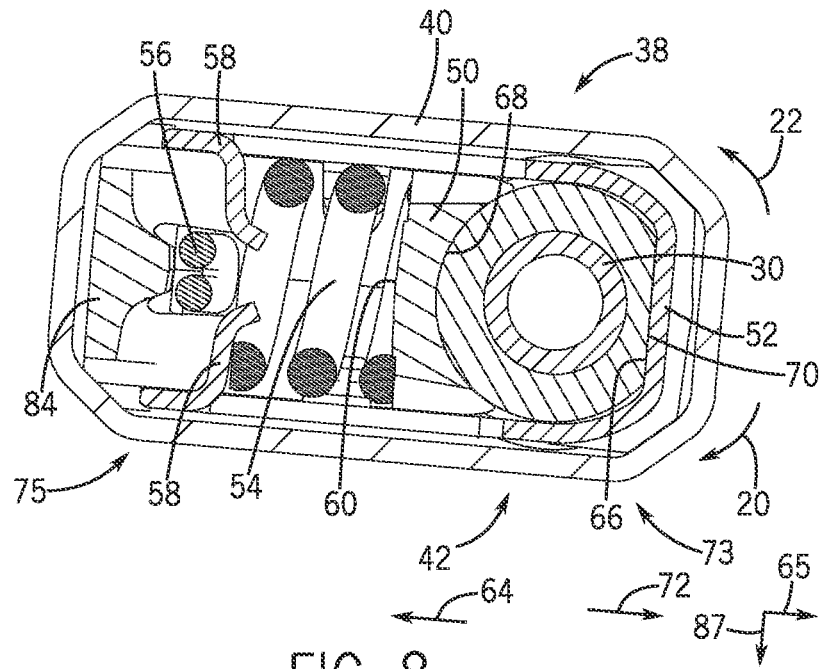
FIG. 8 is a cross-sectional view of the slide-on-rod assembly of FIG. 5, in which the sun visor is in a stowage position.

FIG. 8 is a cross-sectional view of the slide-on-rod assembly 38 of FIG. 5, in which the sun visor is in a stowage position. As the sun visor rotates toward the stowage position, the coil springs 54 drive the spring cage 52 to move in the downward direction 64 between the position shown in FIG. 7 and the position shown in FIG. 8. Accordingly, while the sun visor is in the stowage position, the substantially flat surface 66 of the spring cage 52 and the substantially flat surface 70 of the rod 30 are in contact with one another. As a result, the sun visor is biased into the stowage position. To transition the sun visor to the usage position, a force is applied to the sun visor sufficient to cause the rod 30 to drive the spring cage 52 in the upward direction 72 along the vertical axis 65 against the force of the coil springs 54, thereby facilitating rotation of the sun visor about the rod 30. Because the spring cage 52 includes the contact surface 66, a separate contact plate (e.g., spring plate), which may be positioned vertically below the rod in certain carriage assemblies, may be obviated. As a result, the cost and/or complexity of the carriage assembly may be reduced. In addition, because the coil springs 54 engage the respective spring supports 58 on the spring cage 52, a separate contact plate (e.g., spring plate), which may be positioned vertically below the springs in certain carriage assemblies, may be obviated. As a result, the cost and/or complexity of the carriage assembly may be further reduced.

Figure 9:
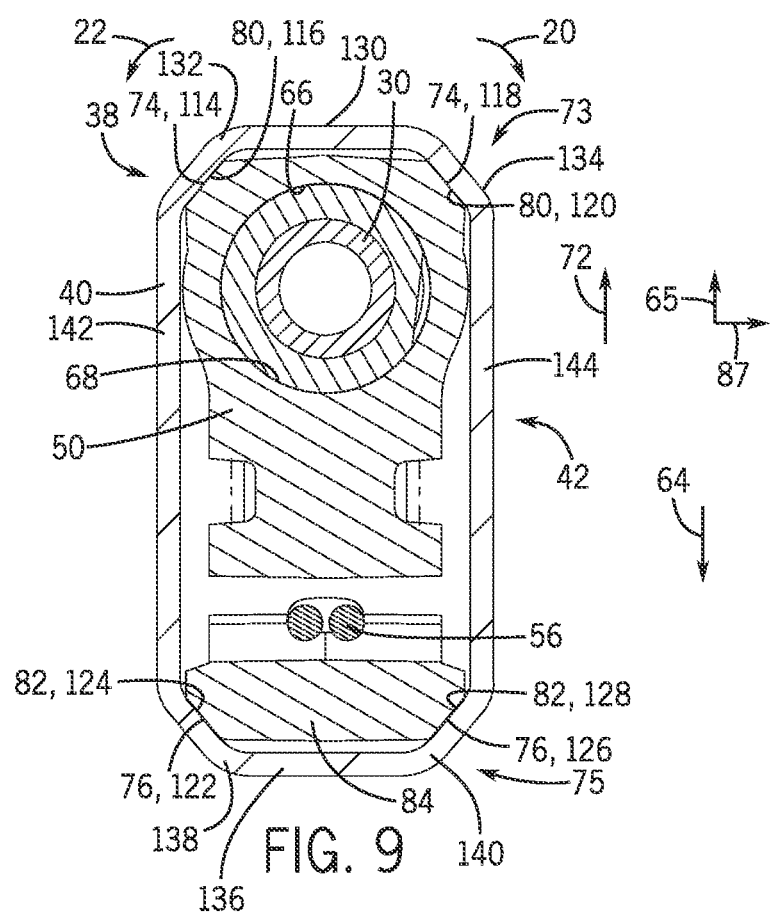
FIG. 9 is a cross-sectional view of the slide-on-rod assembly of FIG. 5, taken along line 9-9.

FIG. 9 is a cross-sectional view of the slide-on-rod assembly 38 of FIG. 5, taken along line 9-9. As illustrated, the first contact surfaces 74 of the carriage 50 engage the corresponding first contact surfaces 80 of the tube 40, and the second contact surfaces 76 of the carriage 50 engage the corresponding second contact surfaces 82 of the tube 40. In the illustrated embodiment, each contact surface of the carriage and each contact surface of the tube is angled relative to the vertical and lateral axes. Accordingly, a first angled contact surface 114 (e.g., corresponding to one of the first contact surfaces 74) of the carriage 50 contacts a first angled contact surface 116 (e.g., corresponding to one of the first contact surfaces 80) of the tube 40. In addition, a second angled contact surface 118 (e.g., corresponding to one of the first contact surfaces 74) of the carriage 50 contacts a second angled contact surface 120 (e.g., corresponding to one of the first contact surfaces 80) of the tube 40. Furthermore, a third angled contact surface 122 (e.g., corresponding to one of the second contact surfaces 76) of the carriage 50 contacts a third angled contact surface 124 (e.g., corresponding to one of the second contact surfaces 82) of the tube 40. And, a fourth angled contact surface 126 (e.g., corresponding to one of the second contact surfaces 76) of the carriage 50 contacts a fourth angled contact surface 128 (e.g., corresponding to one of the second contact surfaces 82) of the tube 40.

In the illustrated embodiment, the tube 40 has an octagonal cross-section formed from a first horizontal wall 130, a first angled wall 132, a second angled wall 134, a second horizontal wall 136, a third angled wall 138, a fourth angled wall 140, a first vertical wall 142, and a second vertical wall 144. The first angled contact surface 116 of the tube 40 is formed on the first angled wall 132, the second angled contact surface 120 of the tube 40 is formed on the second angled wall 134, the third angled contact surface 124 of the tube 40 is formed on the third angled wall 138, and the fourth angled contact surface 128 of the tube 40 is formed on the fourth angled wall 140. As illustrated, the first angled contact surface 116 of the tube 40 is positioned on an opposite lateral side of the tube from the second angled contact surface 120 of the tube 40, the third angled contact surface 124 of the tube 40 is positioned on the opposite lateral side of the tube from the fourth angled contact surface 128 of the tube 40, and the first and second angled contact surfaces 116, 120 of the tube 40 are positioned on an opposite vertical side of the tube from the third and fourth angled contact surfaces 124, 128 of the tube 40. In addition, the first angled contact surface 114 of the carriage 50 is positioned on an opposite lateral side of the carriage from the second angled contact surface 118 of the carriage 50, the third angled contact surface 122 of the carriage 50 is positioned on the opposite lateral side of the carriage from the fourth angled contact surface 126 of the carriage 50, and the first and second angled contact surfaces 114, 118 of the carriage 50 are positioned on an opposite vertical side of the carriage from the third and fourth angled contact surfaces 122, 126 of the carriage 50.

Contact between the contact surfaces of the carriage and the tube establishes resistance to movement of the tube 40 along the longitudinal axis relative to the carriage assembly 42, thereby establishing resistance to movement of the sun visor between the retracted position and the extended position. Because the contact surfaces of the carriage and the tube are angled relative to the vertical and lateral axes, contact between the respective contact surfaces may substantially reduce or eliminate movement of the tube relative to the carriage along the vertical axis 65 and/or along the lateral axis 87. While each of the angled contact surfaces of the tube and each of the angled contact surfaces of the carriage are angled about 45 degrees relative to the vertical axis 65 and about 45 degrees relative to the lateral axis 87, it should be appreciated that in alternative embodiments, each of the angled surfaces may be oriented at any other suitable angle relative to the vertical axis and/or the lateral axis. For example, at least one pair of corresponding (e.g., engaged) contact surfaces may be angled about 10 degrees to about 80 degrees, about 20 degrees to about 70 degrees, about 30 degrees to about 60 degrees, or about 40 degrees to about 50 degrees relative to the vertical axis or the lateral axis. In addition, at least one pair of corresponding (e.g., engaged) contact surfaces may be oriented at a different angle from at least one other pair of corresponding (e.g., engaged) contact surfaces. Furthermore, while each of the contact surfaces is substantially flat in the illustrated embodiment, it should be appreciated that in alternative embodiments, at least one pair of corresponding (e.g., engaged) contact surfaces may have another suitable shape (e.g., curved, arcuate, polygonal, etc.).

In the illustrated embodiment, the second contact surfaces 76 are formed on the wings 84 of the carriage 50. The wings 84 are configured to flex/rotate relative to the body of the carriage, and the wire spring 56 is configured to bias the wings 84 in the downward direction 64. Accordingly, the wire spring 56 drives each of the contact surfaces 74 and 76 of the carriage 50 into contact with the corresponding contact surfaces 80 and 82 of the tube 40. As a result of the angled contact surfaces and the biasing force applied by the wire spring to the wings, the possibility of movement of the tube 40 relative to the carriage 50 along the vertical axis 65 and/or along the lateral axis 87 is substantially reduced or eliminated, thereby substantially reducing or eliminating the possibility of rattling and the associated actuation noise.

Figure 10:
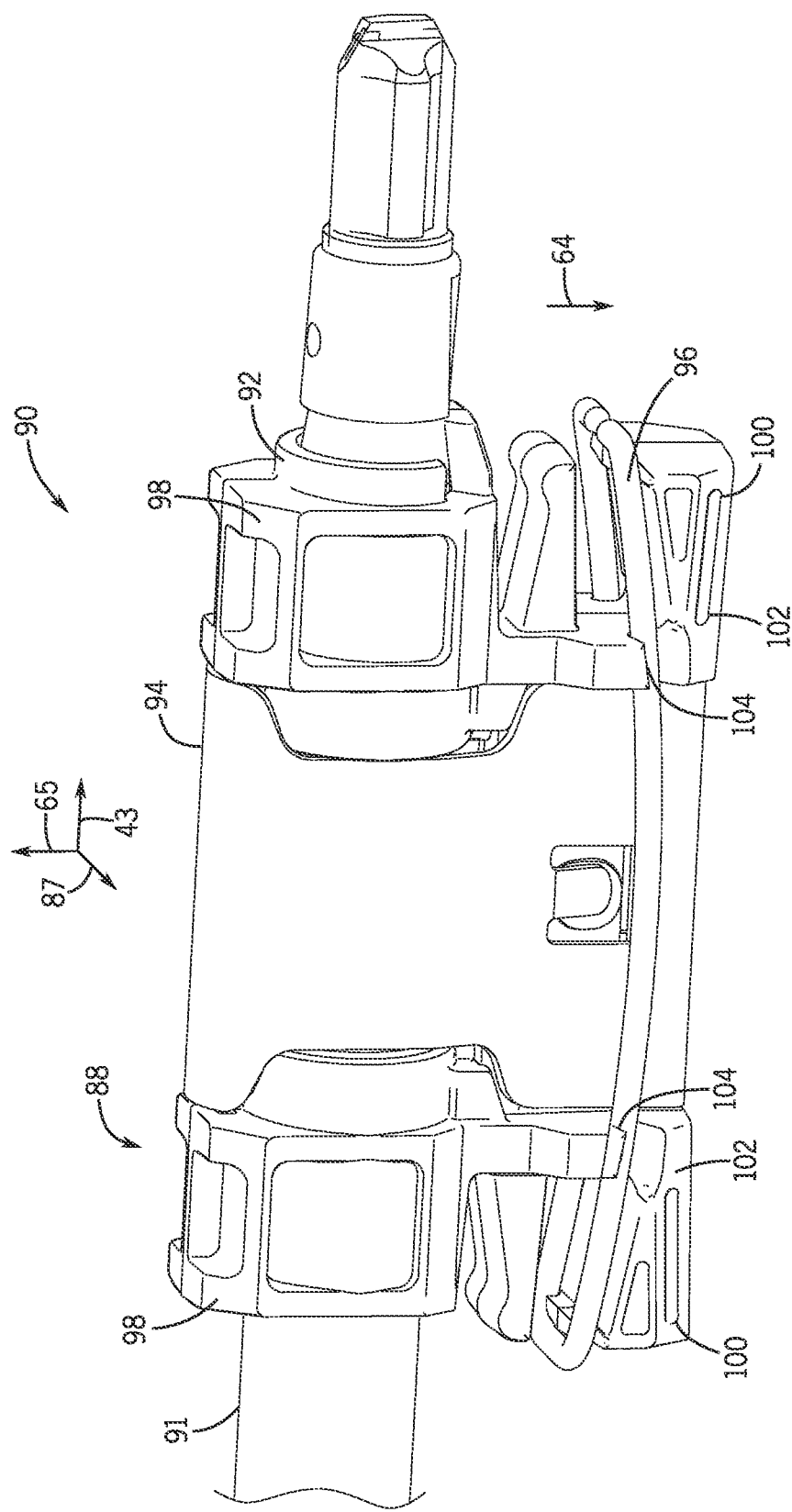
FIG. 10 is a perspective view of an alternative embodiment of a slide-on-rod assembly that may be employed within the sun visor of FIGS. 2-4.

FIG. 10 is a perspective view of an alternative embodiment of a slide-on-rod assembly 88 that may be employed within the sun visor of FIGS. 2-4. In the illustrated embodiment, the slide-on-rod assembly 88 includes a carriage assembly 90 coupled to a rod 91 and configured to be disposed within a tube, such as the octagonal tube of FIGS. 5-9. The carriage assembly 90 includes a carriage 92, a compression member 94, and a wire spring 96. The compression member 94 is configured to contact the rod 91 and to apply a compressive force to the rod 91 along the lateral axis 87 (e.g., each lateral side of the compression member 94 applies a force to the rod 91 in a laterally inward direction). Friction between the rod 91 and the compression member 94 (e.g., the laterally inward surfaces of the compression member 94) establishes resistance to rotation of the sun visor about the rod 91 (e.g., in the first and second rotational directions 20 and 22 about the rotational axis 18).

In the illustrated embodiment, the carriage 92 includes four first contact surfaces 98 on a vertically upper portion of the carriage 92 and four second contact surfaces 100 on a vertically lower portion of the carriage 92. The first contact surfaces 98 are configured to engage corresponding first contact surfaces of the tube, and the second contact surfaces 100 are configured to engage corresponding second contact surfaces of the tube. Contact between the contact surfaces establishes resistance to movement of the tube along the longitudinal axis 43 relative to the carriage assembly 90, thereby establishing resistance to movement of the sun visor between the retracted position and the extended position. In the illustrated embodiment, the second contact surfaces 100 are formed on wings 102 of the carriage 92. As illustrated, the wings 102 extend from opposite longitudinal sides of a body of the carriage. The wings 102 are configured to flex/rotate relative to the body of the carriage, and the wire spring 96 is configured to bias the wings 102 in the downward direction 64 via contact with the wings 102 and support surfaces 104 of the carriage 92. Accordingly, the wire spring 96 is configured to drive each of the contact surfaces 98 and 100 of the carriage 92 into contact with the corresponding contact surfaces of the tube. As a result, the possibility of movement of the tube 40 relative to the carriage 50 along the vertical axis 65 and/or along the lateral axis 87 is substantially reduced or eliminated, thereby substantially reducing or eliminating the possibility of rattling and the associated actuation noise. In addition, the resistance to movement of the sun visor between the retracted position and the extended position may be controlled based on the stiffness of the wire spring 96. For example, a stiffer wire spring may increase the contact force between the contact surfaces of the carriage and the corresponding contact surfaces of the tube, thereby increasing resistance to movement of the sun visor. In addition, a softer wire spring may reduce the contact force between the contact surfaces of the carriage and the corresponding contact surfaces of the tube, thereby reducing the resistance to movement of the sun visor.

While the illustrated embodiment includes a wire spring 96, it should be appreciated that in alternative embodiments, the carriage assembly may include a leaf spring or any other suitable type of biasing member. Furthermore, while the wings 102 are integrally formed with the body of the carriage 92 in the illustrated embodiment, it should be appreciated that in alternative embodiments, the wings may be separately formed and coupled (e.g., rotatably coupled) to the carriage body. In addition, while the illustrated embodiment includes two wings 102, it should be appreciated that in alternative embodiments, the carriage may include more or fewer wings (e.g., 1, 2, 3, 4, or more).

Figure 11:
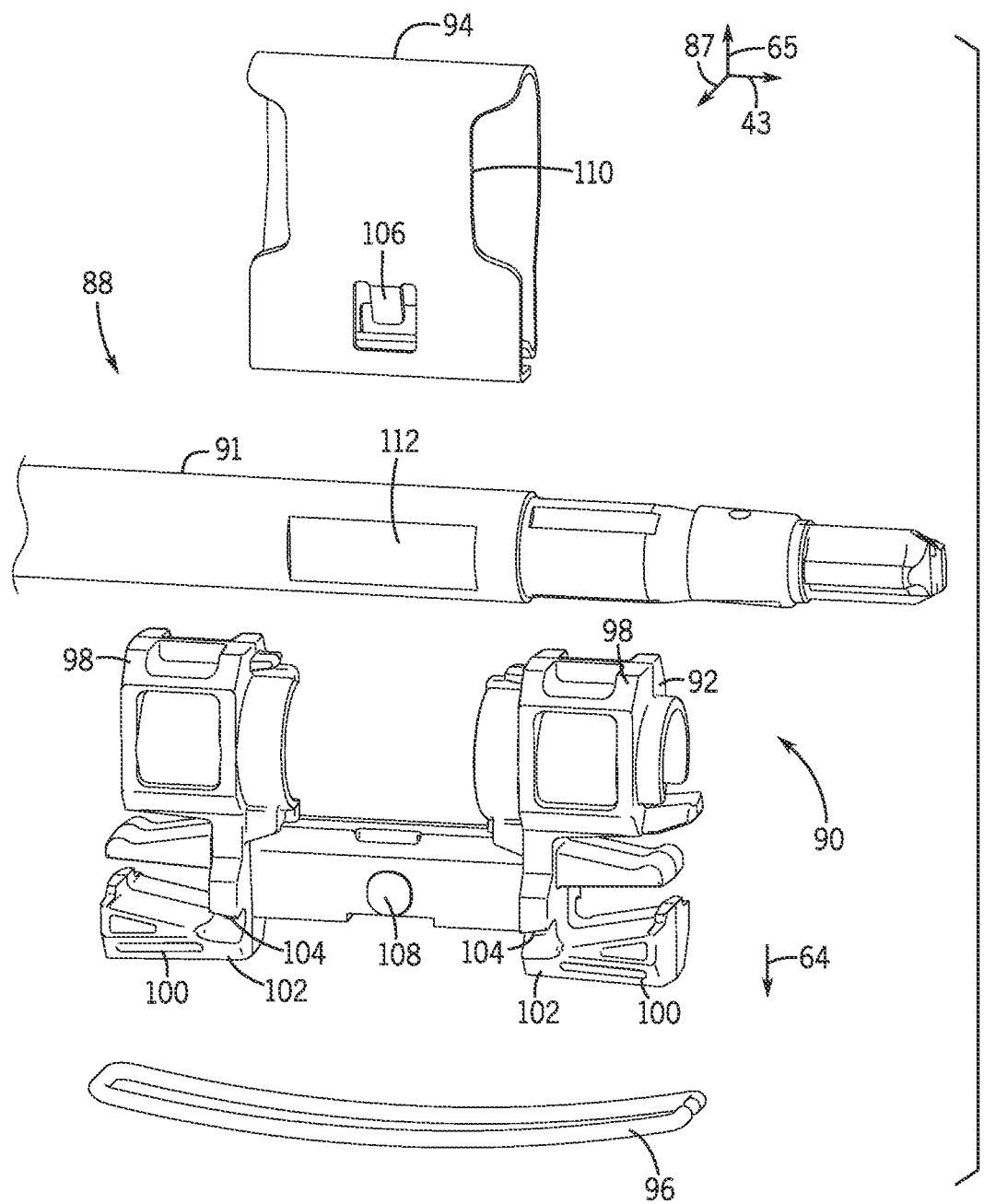
FIG. 11 is an exploded view of the slide-on-rod assembly of FIG. 10.

FIG. 11 is an exploded view of the slide-on-rod assembly 88 of FIG. 10. As illustrated, the compression member 94 includes a protrusion 106 configured to engage a corresponding mounting feature 108 of the carriage 92, thereby securing the compression member 94 to the carriage 92. In certain embodiments, each lateral side of the compression member 94 may include a protrusion 106 configured to engage a corresponding mounting feature 108 on a respective lateral side of the carriage 92. Furthermore, at least one lateral side of the compression member 94 includes a substantially flat portion 110 configured to interact with a corresponding substantially flat portion 112 of the rod 91. While the sun visor is in the stowage position, the substantially flat surfaces 110 and 112 are in contact with one another. As a result, the sun visor is biased into the stowage position. To transition the sun visor to the usage position, a force is applied to the sun visor sufficient to cause the rod 91 to drive the side(s) of the compressing member 94 having the substantially flat portion(s) laterally outward, thereby facilitating rotation of the sun visor about the rod 91. Because the carriage assembly 90 does not include a spring and a separate spring cage, the cost and complexity of the slide-on-rod assembly may be reduced.

The diameter of the rod 30 of the embodiment shown in FIGS. 5-9 is about 10 mm, and the diameter of the rod 91 of the embodiment shown in FIGS. 10-11 is about 25 mm. A smaller diameter (e.g., about 10 mm) rod may enable the sun visor assembly (e.g., sun visor and rod) to be thinner than a sun visor assembly having a larger diameter (e.g., about 25 mm) rod. However, larger diameter (e.g., about 25 mm) rods may be more commercially available than smaller diameter (e.g., about 10 mm) rods. Accordingly, sun visor assemblies having larger diameter (e.g., about 25 mm) rods may be less expensive than sun visor assemblies having smaller diameter (e.g., about 10 mm) rods. In addition, to establish a desired resistance to rotation of the sun visor about the rod, a larger force may be applied to a smaller diameter (e.g., about 10 mm) rod than a larger diameter (e.g., about 25 mm) rod. Accordingly, embodiments including smaller diameter (e.g., about 10 mm) rods may include additional springs and/or spring(s) having a higher spring constant. While a rod 30 having a diameter of about 10 mm and a rod 91 having a diameter of about 25 mm are utilized in the disclosed embodiments, it should be appreciated that rods having other suitable diameters (e.g., 8 mm, etc.) may be employed in alternative embodiments.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle sun visor assembly, comprising:
    a rod having a substantially flat surface; and
    a sun visor configured to rotate about the rod between a stowage position and a usage position, wherein the sun visor comprises:
        a carriage having a first rod contact surface, wherein the carriage has an opening configured to receive the rod;
        a spring cage disposed about at least a portion of the carriage and having a second rod contact surface, wherein the first and second rod contact surfaces are configured to face the rod, and the second rod contact surface of the spring cage is substantially flat and configured to interact with the substantially flat surface of the rod; and
        at least one biasing member disposed between respective support surfaces of the carriage and the spring cage, wherein the at least one biasing member comprises a plurality of coil springs, the plurality of coil springs is configured to urge the first and second rod contact surfaces toward one another such that the first and second rod contact surfaces are driven against the rod to compress the rod, the plurality of coil springs is configured to apply a first force to urge the second rod contact surface against the substantially flat surface of the rod while the sun visor is in the stowage position to bias the sun visor into the stowage position, and the rod is configured to drive the spring cage to move in an upward direction relative to the carriage along a vertical axis against the first force applied by the plurality of coil springs in response to application of a second force to the sun visor sufficient to drive the sun visor to rotate about the rod from the stowage position to the usage position.

2. The vehicle sun visor assembly of claim 1, wherein the rod has a recess, and the carriage has a protrusion configured to engage the recess of the rod to couple the carriage to the rod.

3. The vehicle sun visor assembly of claim 1, wherein the first rod contact surface of the carriage faces away from the support surface of the carriage.

4. The vehicle sun visor assembly of claim 1, comprising a tube configured to be secured to the sun visor, wherein the carriage is configured to move within the tube.

5. The sun visor assembly of claim 4, wherein the carriage has a plurality of angled carriage contact surfaces, the tube has a corresponding plurality of angled tube contact surfaces, and the plurality of angled carriage contact surfaces is configured to contact the corresponding plurality of angled tube contact surfaces.

6. The sun visor assembly of claim 5, wherein the tube has a substantially octagonal cross-section, and the corresponding plurality of angled tube contact surfaces are formed on respective angled walls of the tube.

7. The vehicle sun visor assembly of claim 5, wherein the plurality of angled carriage contact surfaces comprises four first contact surfaces on a vertically upper portion of the carriage and four second contact surfaces on a vertically lower portion of the carriage.

8. The vehicle sun visor assembly of claim 7, comprising a wire spring configured to drive the plurality of carriage contact surfaces into contact with the corresponding plurality of angled tube contact surfaces to reduce movement of the tube relative to the carriage along the vertical axis, along a lateral axis, or a combination thereof.

9. The vehicle sun visor assembly of claim 8, wherein a stiffness of the wire spring is configured to control resistance to movement of the sun visor between a retracted position and an extended position.

10. The vehicle sun visor assembly of claim 7, comprising a wire spring, wherein the second contact surfaces are formed on wings of the carriage, the wings extend from opposite longitudinal sides of a body of the carriage, the wings are configured to flex or rotate relative to the body of the carriage, and the wire spring is configured to bias the wings in a downward direction via contact with the wings and a wire spring support surface of the carriage.

11. The vehicle sun visor assembly of claim 1, wherein the second rod contact surface is positioned on an opposite side of the first rod contact surface from the at least one biasing member.

12. The vehicle sun visor assembly of claim 1, comprising a wire spring.

13. The vehicle sun visor assembly of claim 12, wherein the plurality of coil springs is configured to apply the first force to urge the spring cage in a downward direction along the vertical axis.

14. The vehicle sun visor assembly of claim 13, wherein the first and second rod contact surfaces are configured to create friction between the rod and the first and second rod contact surfaces to establish resistance to rotation of the sun visor about the rod.

15. The vehicle sun visor assembly of claim 1, wherein the sun visor is configured to move in a first translational direction from a retracted position to an extended position, and the sun visor includes a slide-on-rod assembly configured to enable the sun visor to slide relative to the rod.

16. The vehicle sun visor assembly of claim 15, wherein the slide-on-rod assembly comprises a tube, the carriage is configured to be disposed within the tube, the tube is configured to be secured to the sun visor, and the carriage is configured to couple to the rod.

\* \* \* \* \*